United States Patent
Marshall et al.

(10) Patent No.: US 6,773,632 B1
(45) Date of Patent: Aug. 10, 2004

(54) ENHANCED VERY HIGH VOLT ELECTROLYTE

(75) Inventors: Timothy R. Marshall, Pickens, SC (US); Thomas F. Strange, Easley, SC (US)

(73) Assignee: Pacesetter, Inc., Sunnyvale, CA (US)

( * ) Notice: Subject to any disclaimer, the term of this patent is extended or adjusted under 35 U.S.C. 154(b) by 209 days.

(21) Appl. No.: 09/861,227

(22) Filed: May 17, 2001

Related U.S. Application Data

(62) Division of application No. 09/458,549, filed on Dec. 9, 1999.

(51) Int. Cl.$^7$ ................................................ H01B 1/00
(52) U.S. Cl. ...................... 252/500; 252/510; 252/511; 361/526; 361/503; 361/504; 361/506; 361/511; 361/525; 205/58
(58) Field of Search ........................... 252/500, 510, 252/511; 361/526, 503, 504, 506, 511, 525; 205/58

(56) References Cited

U.S. PATENT DOCUMENTS

| | | | |
|---|---|---|---|
| 4,385,342 A | 5/1983 | Puppolo et al. ............. 361/433 |
| 4,593,343 A | 6/1986 | Ross ......................... 361/433 |
| 4,942,501 A | 7/1990 | MacFarlane et al. ........ 361/523 |
| 5,086,374 A | 2/1992 | MacFarlane et al. ........ 361/525 |
| 5,131,388 A | 7/1992 | Pless et al. ............. 128/419 D |
| 5,146,391 A | 9/1992 | MacFarlane et al. ........ 361/525 |
| 5,153,820 A | 10/1992 | MacFarlane et al. ........ 361/525 |
| 5,503,718 A | 4/1996 | Kakizakai ...................... 216/6 |
| 5,522,851 A | 6/1996 | Fayram ......................... 607/5 |
| 5,585,039 A | 12/1996 | Matsumoto et al. ........ 252/500 |
| 5,616,274 A | 4/1997 | Kanbara et al. ........... 252/62.2 |
| 5,628,801 A | 5/1997 | MacFarlane et al. ....... 29/25.03 |
| 5,660,737 A | 8/1997 | Elias et al. .................... 216/6 |
| 5,748,439 A | 5/1998 | MacFarlane et al. ........ 361/525 |
| 5,801,917 A | 9/1998 | Elias ......................... 361/53.5 |
| 5,814,082 A | 9/1998 | Fayram et al. ................. 607/5 |
| 6,287,630 B1 | 9/2001 | Strange et al. ................ 427/80 |
| 6,468,317 B1 * | 10/2002 | Strange et al. ............. 29/25.03 |

* cited by examiner

*Primary Examiner*—Yogendra N. Gupta
*Assistant Examiner*—Derrick G. Hamlin
(74) *Attorney, Agent, or Firm*—Steven M. Mitchell

(57) ABSTRACT

The present invention is directed toward an enhanced very high volt electrolyte for use in electrolytic capacitors. In particular, by the inclusion of a polymer matrix of a hydrogel, preferably of the family of poly(hydroxy alkyl methacrylate) but also including polyvinylalcohol (PVA), polyacrylonitrile (PAN), into a standard fill electrolyte, the breakdown voltage of the enhanced very high volt electrolyte of the present invention is raised to as much as 800 V. An electrolytic capacitor impregnated with the enhanced very high volt electrolyte of the present invention, is capable of operating at a voltage of 700 to 800 volts. The production of a very high volt capacitor capable of operating at a voltage of 700 to 800 volts allows a single high volt electrolytic capacitor to replace the conventional two capacitors-in-series arrangement of an Implantable Cardioverter Defibrillator (ICD). Having a single high voltage capacitor results in savings in cost and in space required, especially where internal volume is at a premium, such as in an ICD and related medical implant devices.

24 Claims, No Drawings

ENHANCED VERY HIGH VOLT ELECTROLYTE

This is a divisional of copending application Ser. No. 09/458,549, filed on Dec. 9, 1999.

BACKGROUND OF THE INVENTION

1. Field of the Invention

This invention relates generally to a very high volt electrolyte for use in electrolytic capacitors and to an electrolytic capacitor impregnated with the electrolyte of the present invention for use in implantable cardioverter defibrillators (ICD). More specifically, the invention relates to the incorporation of a polymer matrix into a standard solvent-based fill electrolyte to raise the breakdown voltage (limit) of the electrolyte to as much as 800 V and, in turn, to a very high volt aluminum electrolytic capacitor impregnated with the electrolyte of the present invention, operating at a voltage of 700 to 800 volts.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, use two electrolytic capacitors in series to achieve, the desired high voltage for shock delivery. For example, an implantable cardioverter defibrillator may utilize two 350 to 400 volt electrolytic capacitors in series to achieve a voltage of 700 to 800 volts.

To further reduce the size of the implanted device, there is a need for a single capacitor arrangement for an ICD, capable of operating at a voltage of 700 to 800 volts, which can replace the current two capacitors in series arrangement. However, this has not been possible since available electrolytic capacitor technology has limited photo flash electrolytic capacitor voltages to 600V and below.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

Conventional electrolytic capacitors that employ a standard solvent-based liquid electrolyte utilize a thick mechanical separator, typically made of kraft paper, that is impregnated with and acts as a reservoir for the electrolyte. However, it has been suggested that by using a polymer based electrolyte, the thickness of the separator material can be greatly reduced and, in some cases, the separator material can be eliminated entirely.

U.S. Pat. No. 4,942,501 and its continuations, U.S. Pat. Nos. 5,146,391 and 5,153,820, each of which is incorporated herein by reference, suggest reducing the volume of electrolytic capacitors by completely eliminating the need for a mechanical separator. They provide an electrolytic capacitor that instead employs, between its anode and cathode, a layer of solid electrolyte comprising a solid solution of a metal salt in a polymer matrix. The preferred method of constructing these capacitors is to deposit a liquid prepolymer electrolyte mixture onto the surface of the anode, and then to cause polymerization to take place to cure the electrolyte. The cathode is thereafter formed by deposition upon the surface of the cured electrolyte layer.

U.S. Pat. No. 5,585,039, incorporated herein by reference, suggests producing a solid polymer electrolyte consisting of the containment of an electrolyte solution within a polymer matrix having a multiphase structure, suitable for use in high energy density batteries, such as lithium batteries. Also disclosed is a method of manufacturing the solid polymer electrolyte comprising the steps of preparing a polymer matrix having a multiphase structure first, followed by impregnating the electrolyte solution into the polymer matrix. Alternatively, the method may comprise the steps of preparing a polymer matrix having a multiphase structure and containing an electrolyte first, then impregnating a solvent into the polymer matrix having the multiphase structure containing the electrolyte.

In known processes for impregnating electrolytic capacitor stacks or wound rolls with solid polymer electrolytes, a polymerization initiator is typically mixed with the electrolyte prior to impregnation. For example, U.S. Pat. No. 5,628,801 discloses an electrolytic capacitor where a solid electrolyte alone or a separator impregnated with an elastomeric solid electrolyte is utilized in the dual capacity of electrolyte and adhesive material to hold together the anode and cathode plates of the capacitor. The preferred electrolyte consists of: 17.5 parts of hydroxyethylmethacrylate, 32.5 parts ethylene glycol, 7.0 parts ammonium adipate, 6.7 parts ammonium glutarate, 0.45 parts tetraethyleneglycoldiacrylate, and 2.2 parts of initiator solution. The preferred initiator solution consists of a solution of 3.6 g of $Cu(No_3)_2 \cdot 3H_2O$ and 42.4 g of $K_2S_2O_8$ per liter of pure water. The capacitor assembly is impregnated with this polymerizable liquid electrolyte/adhesive and then heated to approximately 55° C. for at least 2 hours, but preferably 24 hours to cure the electrolyte/adhesive.

Similarly, U.S. Pat. No. 5,748,439 discloses an electrolytic capacitor having interposed between the electrically conductive anode and cathode layers thereof a reduced thickness spacer comprised of a mechanical separator means such as kraft paper impregnated with a crosslinked elastomeric electrolyte. The electrolyte is preferably made up as a liquid prepolymer electrolyte mixture prior to impregnation into the capacitor element and the polymer is preferably formed in situ thereafter from the prepolymer mixture. The prepolymer electrolyte mixture is preferably made up by first dissolving a salt into a liquid plasticizer component by stirring at elevated temperatures, cooling the mixture to room temperature, and then adding to the mixture a monomer corresponding to the desired polymer and a crosslinking agent, as well as a polymerization initiator. As a result, the electrolyte acts to strengthen the separator material, allowing a storage device to be constructed with separator materials of reduced thickness.

The problem with the above polymer electrolytes and processes for impregnating electrolytic capacitors with such polymer electrolytes is incomplete filling of the macroscopic tunnels in the etched aluminum anodes. The processes described above suggest combining a polymerization initiator compound with the polymer electrolyte mixture, prior to impregnation, to promote the break down of the ionic salt of the electrolyte mixture. However, when the polymerization initiator is mixed with the polymer electrolyte, polymerization begins, increasing the viscosity of the solution, which reduces the working pot life. Heating the electrolyte mixture to reduce viscosity, a common practice in the industry, only serves to hasten the curing of the polymer and thus defeats the intended purposes. Because of the increased viscosity and the reduced working time, the polymer mixture has insufficient time to fully incorporate itself into the microscopic features of the anode foil. Capacitance is lost due to the incomplete use of the etched foil. Consequently, such capacitors have a breakdown voltage of less than 700 volts. Thus, there is a need for an improved electrolyte and impregnation process which solves these problems.

SUMMARY OF THE INVENTION

The present invention is directed to an enhanced very high volt electrolyte for use in electrolytic capacitors. By the inclusion of a polymer matrix of a hydrogel, preferably of the family of poly(hydroxyalkylmethacrylate) but also including polyvinylalcohol (PVA) and polyacrylonitrile (PAN), into a standard fill electrolyte mixture, the breakdown voltage of the electrolytic capacitor is enhanced by 20 to 100 volts over an electrolytic capacitor impregnated with a standard, straight, or neat fill, electrolyte, raising the breakdown voltage of the capacitor to 700 to 800 V, making a single capacitor ICD more practical. In order to achieve 800 V with the polymer electrolyte, the standard fill electrolyte must be capable of over 650V by itself. Any standard fill electrolyte will benefit from the addition of the HEMA polymer by improving its breakdown voltage by 20–100V. The standard fill electrolyte may be a mixture of a weak acid and a salt of a weak acid, preferably a salt of the weak acid employed, in a polyhydroxy alcohol solvent. The preferred solvent-based electrolyte consists of an ethylene glycol solution of a long chain dicarboxylic acid or acids, boric acid, a base such as an amine or ammonia, with a small amount of water. Examples of long chain dicarboxylic acids include dodecanedioic, undecanedioic, dimer and trimer acids. The electrolyte may also contain other cosolvents such as DMSO, DMF, NMF and acetonitrile and may also include small quantities of a long chain monocarboxylic acid.

The breakdown voltage of the electrolytic capacitor can be further enhancer by impregnating the electrolytic capacitor with a polymerization initiator prior to the impregnation of the polymer electrolyte mixture. This process improves the incorporation of the polymer into the anode foil, which thereby increases the capacitance. This is accomplished by separating the polymerization initiator from the polymer electrolyte mixture and locating the polymerization initiator in intimate contact with the areas where polymerization is desired (as in the anode foil tunnels, paper, or cathode structure). This allows the polymer electrolyte mixture of the present invention to be heated to any desired temperature, up to 90° C., prior to impregnation, thereby reducing the viscosity of the solution, and allowing full impregnation into the initiator treated stack or wound roll. The reduced viscosity lessens resistance when the solution is filling the voids of the anode foil. Additionally, separating the polymerization initiator from the polymer electrolyte mixture has the advantage of increasing the working pot life of the polymer electrolyte mixture. Polymerization does not begin to occur until after impregnation of the capacitor.

The very high volt aluminum electrolytic capacitor of the present invention is capable of operating at a voltage of 700 to 800 volts, 20 to 100 volts higher than prior electrolytic capacitors impregnated with a standard electrolyte. The design of a very high volt capacitor according to the present invention can include an aluminum electrolytic capacitor of the flat capacitor design with 1 to 4 anodes per layer or of the wound or rolled capacitor design.

This capacitor is able to support voltages of 700 to 800 volts, while being of reduced size, and is therefore superior to other known electrolytic capacitors for use in implantable cardioverter defibrillators. The production of a very high volt capacitor capable of operating at a voltage of 700 to 800 volts allows a single high volt electrolytic capacitor to replace the conventional two capacitors-in-series arrangement of an ICD. Replacing two lower voltage electrolytic capacitors with a single very high volt electrolytic capacitor results in space savings, especially where internal volume is at a premium, such as in ICDs and related medical implant devices, and results in a reduction in capacitor cost and in the complexity of assembly, while increasing reliability.

DETAILED DESCRIPTION OF THE PREFERRED EMBODIMENTS

The present invention is directed toward an enhanced very high volt electrolyte and a very high volt capacitor impregnated with the electrolyte of the present invention for use in an ICD. In particular, by the inclusion of a polymer matrix of a hydrogel, preferably of the family of poly(hydroxy alkyl methacrylate) but also including polyvinylalcohol and polyacrylonitrile, into a standard fill electrolyte, the breakdown voltage of the enhanced very high volt electrolyte of the present invention is raised to as much as 800 V, making a single capacitor ICD more practical. A very high volt electrolytic capacitor according to the present invention, impregnated with the enhanced very high volt electrolyte of the present invention, is capable of operating at a voltage of 700 to 800 volts.

According to the present invention, prior to the impregnation of the capacitor, the etched and formed anode foil is preloaded with a polymerization initiator. The polymerization initiator is preferably an aqueous solution of a persulfate ($S_2O_8^{-2}$) salt, typically an alkyl metal or ammonium salt, such as potassium persulfate, ammonium persulfate. Other free radical initiators are suitable as well, such as azoxyisobutyronitrile (AIBN) or benzoyl peroxide. For example, the initiator may be incorporated into the anode foil by means of soaking the anode foil or capacitor stack in a dilute, 0.2+/−0.05%, aqueous solution of a persulfate salt. Additionally, miscible organic solvents of high vapor pressure, such as methanol, ethanol, acetone, methylethyl ketone, toluene, and other low boiling organic solvents may be added to speed drying. Copper nitrate may also be added as a catalyst to the polymerization initiator. A preferred polymerization initiator solution comprises 0.09 g of $Cu(No_3)_2$ and 25 g of $K_2S_2O_8$ per liter of pure water. The impregnation of the anode foil with the polymerization initiator may be done prior to the construction of the capacitor or as a precursor to the impregnation of the capacitor with the polymer electrolyte mixture. Alternatively, the polymerization initiator compound may be added directly to the polymer electrolyte mixture, prior to impregnation into the capacitor, however, upon warming the electrolyte mixture, polymerization begins, decreasing the working time.

After the foils have been dried at room temperature (less than 35° C.) to prevent the premature break down of the persulfate salt into the sulfate ion, anodes are cut and the capacitor assembled. In the case of a capacitor stack, the stack is vacuum dried at room temperature (less than 35° C.).

The polymer based electrolyte is prepared by adding a polymer matrix to a standard fill electrolyte, in an oxygen limited atmosphere where the total oxygen concentration is less than 2%. The polymeric matrix may be based on the family of acrylate monomers, such as hydroxyethylmethacrylate (HEMA) or hydroxyethylacrylate (HEA), or may be based on polyvinylalcohol or polyacrylonitrile. The preferred polymer matrix is based on 2-hydroxyethylmethacrylate, with ratios of 30 to 60% HEMA, with a preferred ratio of 40% HEMA. The solvent-based fill electrolyte may be any of the various fill electrolytes known to those skilled in the art as suitable for use in electrolytic capacitor manufacture. A typical solvent-based electrolyte is a mixture of a weak acid and a salt of a weak acid, preferably a salt of the weak acid employed, in a polyhydroxy alcohol solvent. Examples of acids used in the fill electrolyte include boric, undecanedioic, dodecanedioic, dimer and trimer acids. The salts of these acids can be ammonium salts or salts of various amines such as monomethylamine, dimethylamine, trimethylamine, isopropylamine. The solvents for the fill electrolyte can include ethylene glycol, propylene glycol, 1-methyl-2-pyrrolidone, gammabutyrolactone, dimethylformamide, dimethyl acetamide, mixtures of these materials and the like, as would be apparent to one or ordinary skill in the relevant art. Ethylene and propylene glycol are the preferred solvents. For example, the solvent-based liquid electrolyte may be boric acid and phosphoric acid in an ethylene glycol solvent base. The preferred fill electrolyte is an ethylene glycol solution containing 4% to 9% dimer acid, up to 2.0% boric acid, 1.0% degassing agent such as nitroanisole, and up to 5.0% of a 20% solution of colloidal silica in ethylene glycol, with the pH adjusted by the addition of ammonium hydroxide. This electrolyte may also include up to 20% by weight a co-solvent of butyl carbitol, preferably 10%. This mixture may also contain a compound for crosslinking such as, but not limited to, tetraethyleneglycoldiacrylate(TEGDA). For example, the addition of 1.0+/−0.5% TEGDA to the electrolyte may be used for cross linking of the polymer. Alternative divinyl crosslinking agents include ethylene glycol dimethacrylate (EGDMA) and diethylene glycol dimethacrylate (DEGDMA).

The polymer matrix is mixed with the standard solvent-based electrolyte and is warmed to a temperature of 50 to 90° C. with a preferred temperature of 70° C., to decrease viscosity and allow for increased penetration into the microscopic features in the anode foil. The pre-loaded capacitor is then vacuum impregnated with the warmed mixture, by placing the capacitor in contact with the warmed electrolyte and reducing the pressure to less than 50 cm Hg. The capacitor is held at this low pressure for 5 to 45 minutes with a preferred time of 15 minutes, and then pressure is restored, using the pressure to force the electrolyte mixture into the capacitor. The capacitor is then removed and placed in a 65 to 90° C. oven with a preferred temperature of 90° C. and a maximum oxygen atmospheric concentration of 2% for a period of 2 to 24 hours, with a preferred time of 4 hours, to break down the persulfate salt and polymerize the HEMA. The capacitor is then aged in a normal manner by applying the working voltage to the capacitor, allowing the capacitor to reach this voltage, and then allowing the current to decrease.

While the above discussion has been directed to a method of impregnation using a hydroxyethylmethacrylate(HEMA) and ethylene glycol based electrolyte mixture, it will be apparent to one of ordinary skill in the relevant art that a similar method could be employed using an polymer electrolyte mixture incorporating a different polymer matrix of a hydrogel, such as polyvinylalcohol or polyacrylonitrile and/or a propylene glycol, 1-methyl-2-pyrrolidone, gammabutyrolactone, dimethylformamide, dimethyl acetamide or alternative solvent-based electrolyte.

According to the present invention, an aluminum electrolytic capacitor can be produced of the flat capacitor design with 1 to 4 anodes per layer or of the rolled capacitor design, either of which has for its anode, aluminum foil that has been etched for use at very high voltages, and formed at voltages of 800 to 1000 volts, with an effective formation voltage of 920 volts for a 800 V capacitor.

A flat capacitor according to the present invention is constructed of anode and cathode layers, stacked with a paper insulator or spacer between each layer. The anode layer is composed of one or more anode foils stacked together without any paper spacer, to form a high energy density anode element. The layers are then grouped together in a parallel connection to produce sufficient capacitance for the intended function. This finished stack is inserted into a case with a geometry closely following the contour of the stack, and designed to minimize the space occupied inside the finished defibrillator.

In one embodiment of the present invention, the design of the very high volt capacitor is that of a flat capacitor with a single, one to four anode per layer design with a highly etched aluminum anode foil having an effective formation voltage of 800 to 1000 volts. The electrolyte utilized is the very high volt polymer electrolyte of the present invention with a breakdown voltage of 700–800 V. According to the present invention, the polymer electrolyte mixture comprises a standard photoflash electrolyte combined with a polymer matrix of a hydrogel, preferably of, but not exclusive of, the family of poly(hydroxyalkylmethacrylate), polyvinylalcohol, or polyacrylonitrile. The preferred hydrogel is a polymerized 2-hydroxyethylmethacrylate. The photoflash electrolyte is a standard fill electrolyte capable of reaching 650 volts without breakdown, without the addition of HEMA. The solvent used in the fill electrolyte may be ethylene or propylene glycol, 1-methyl-2-pyrrolidone, gamma-butyrolactone, dimethyl formamide, dimethyl acetamide, mixtures of these materials, and the like, as would be apparent to one of ordinary skill in the relevant art. The preferred solvent-based electrolyte comprises boric acid and phosphoric acid in an ethylene glycol solvent base. Most preferred, is an ethylene glycol solution containing 4% to 9% dimer acid, up to 2.0% boric acid, 1.0% degassing agent such as nitroanisole, and up to 5.0% of a 20% solution of colloidal silica in ethylene glycol, with the pH adjusted by the addition of ammonium hydroxide. This electrolyte may also include up to 20% by weight a co-solvent of butyl carbitol, preferably 10%.

In a second embodiment of the present invention, the design of the very high volt electrolytic capacitor may be a traditionally designed rolled capacitor in either a cylindrical or flattened cylindrical shape. The anode foil has an effective formation voltage of 800 to 1000 volts but has a lower capacitance per square centimeter of projected area than the first design due to the fact that the anode foil must have enough strength to be rolled. The electrolyte utilized is the very high volt polymer electrolyte of the present invention with a breakdown voltage of greater than 700 V, as discussed above with respect to the first embodiment.

Electrolytic capacitors according to the present invention can be incorporated into implantable medical devices, such as implantable cardioverter defibrillators (ICDs), as would be apparent to one skilled in the art, as described in U.S. Pat. No. 5,522,851 issued to Fayram.

EXAMPLES

An investigation was conducted examining the capacitance and voltage characteristics of the capacitors produced according to the present invention. The experiments provided below are exemplary of the capacitor constructions described above and are not intended to limit the scope of the present invention.

The voltage measurements show that the capacitors produced in accordance with the present invention will support voltages in excess of 700 Volts, and up to about 800 Volts.

Example 1

Three single anode sandwich capacitors were created using 900V foils and standard fill electrolyte in a polymer base. Double thickness paper was used as the separator. The polymer electrolyte solution consisted of 9.6 g of a solution consisting of 95 g standard fill electrolyte, 0.9 g TEGDA, 6.0 g HEMA and 0.4 ml $K_2S_2O_{8(sat.)}$. Copper nitrate was added as a catalyst to the polymerization initiator (0.09 g $Cu(NO_3)_2$ to 25 g $K_2S_2O_8$). The capacitors were heated in an oven at 70° C. for 2 hours.

Full polymerization was achieved. All three single anode capacitors reached 800V. Some aging took place, so that the current bled down to approximately 400 µA. During aging, some hissing and popping occurred, probably due to the heating giving off water and other liquids. Bridge measurements showed capacitance values of 1.62 µF, 1.62 µF and 1.47 µF and an effective series resistance (ESR) of approximately 70Ω, possibly due to design.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all patents, patent applications and publications mentioned above are incorporated by reference herein.

What is claimed is:

1. A process for impregnating an electrolytic capacitor stack or wound roll with an electrolyte having a breakdown voltage of at least about 700 V, comprising:
   (a) impregnating said stack or wound roll with a polymerization initiator;
   (b) contacting said stack or wound roll with a polymer electrolyte solution comprising a polymer matrix of a hydrogel in an organic solvent-based liquid electrolyte, said solvent-based electrolyte comprising a solution of 2.0%±0.5% Boric acid; and
   (c) curing said polymer.

2. A process according to claim 1, wherein said polymer matrix is a poly(hydroxyalkylmethacrylate) based polymer matrix.

3. A process according to claim 2, wherein said polymer matrix comprises hydroxyethylmethacrylate.

4. A process according to claim 1, wherein said polymer matrix is a polyvinylalcohol based polymer matrix.

5. A process according to claim 1, wherein said polymer matrix is a polyacrylonitrile based polymer matrix.

6. A process according to claim 1, wherein said solvent-based electrolyte comprises boric acid and phosphoric acid in an ethylene glycol solvent base.

7. A process according to claim 1, wherein said solvent-based electrolyte comprises an ethylene glycol solution of 2.0%±0.5% Boric acid, 5.0%±2% water, and 50 ppm phosphoric acid.

8. A process for impregnating an electrolytic capacitor stack or wound roll with an electrolyte having a breakdown voltage of at least about 700 V, comprising
   (a) impregnating said stack or wound roll with a solution comprising a polymerization initiator and a polymer matrix of a hydrogel in an organic solvent-based liquid electrolyte, said solvent-based electrolyte comprising a solution of 2.0%±0.5% Boric acid; and
   (b) curing said polymer.

9. A process according to claim 8, wherein said polymer matrix is a poly(hydroxyalkylmethacrylate) based polymer matrix.

10. A process according to claim 9, wherein said polymer matrix comprises hydroxyethylmethacrylate.

11. A process according to claim 8, wherein said polymer matrix is a polyvinyl alcohol based polymer matrix.

12. A process according to claim 8, wherein said polymer matrix is a polyacrylonitrile based polymer matrix.

13. A process according to claim 8, wherein said solvent-based electrolyte comprises boric acid and phosphoric acid in an ethylene glycol solvent base.

14. A process according to claim 8, wherein said solvent-based electrolyte comprises an ethylene glycol solution of 2.0%±0.5% Boric acid, 5.0%±2% water, and 50 ppm phosphoric acid.

15. A process according to claim 1, wherein said solvent-based electrolyte comprises an ethylene glycol solution containing 4% to 9% dimer acid, 2.0%±0.5% Boric acid, and about 1.0% degassing agent.

16. A process according to claim 8, wherein said solvent-based electrolyte comprises an ethylene glycol solution containing 4% to 9% dimer acid, 2.0%±0.5% Boric acid, and about 1.0% degassing agent.

17. A process for impregnating an electrolytic capacitor stack or wound roll with an electrolyte having a breakdown voltage of at least about 700 V, comprising:
   (a) impregnating said stack or wound roll with a polymerization initiator;
   (b) contacting said stack or wound roll with a polymer electrolyte solution comprising a polymer matrix of a hydrogel in an organic solvent-based liquid electrolyte, said solvent-based electrolyte comprising a solution of between about 4% and 9% dimer acid; and
   (c) curing said polymer.

18. A process for impregnating an electrolytic capacitor stack or wound roll with an electrolyte having a breakdown voltage of at least about 700 V, comprising:
   (a) impregnating said stack or wound roll with a polymerization initiator;
   (b) contacting said stack or wound roll with a polymer electrolyte solution comprising a polymer matrix of a hydrogel in an organic solvent-based liquid electrolyte, said solvent-based electrolyte comprising a solution of about 1.0% degassing agent; and (c) curing said polymer.

19. A process for impregnating an electrolytic capacitor stack or wound roll with an electrolyte having a breakdown voltage of at least about 700 V, comprising:

(a) impregnating said stack or wound roll with a polymerization initiator;

(b) contacting said stack or wound roll with a polymer electrolyte solution comprising a polymer matrix of a hydrogel in an organic solvent-based liquid electrolyte, said solvent-based electrolyte comprising up to 5.0% of a 20% solution of colloidal silica in ethylene glycol; and (c) curing said polymer.

20. A process for impregnating an electrolytic capacitor stack or wound roll with an electrolyte having a breakdown voltage of at least about 700 V, comprising:

(a) impregnating said stack or wound roll with a polymerization initiator;

(b) contacting said stack or wound roll with a polymer electrolyte solution comprising a polymer matrix of a hydrogel in an organic solvent-based liquid electrolyte, said solvent-based electrolyte comprising up to 20% by weight of a co-solvent of butyl carbitol; and (c) curing said polymer.

21. A process for impregnating an electrolytic capacitor stack or wound roll with an electrolyte having a breakdown voltage of at least about 700 V, comprising:

(a) impregnating said stack or wound roll with a solution comprising a polymerization initiator and a polymer matrix of a hydrogel in an organic solvent-based liquid electrolyte, said solvent-based electrolyte comprising a solution of between about 4% and 9% dimer acid; and (b) curing said polymer.

22. A process for impregnating an electrolytic capacitor stack or wound roll with an electrolyte having a breakdown voltage of at least about 700 V, comprising:

(a) impregnating said stack or wound roll with a solution comprising a polymerization initiator and a polymer matrix of a hydrogel in an organic solvent-based liquid electrolyte, said solvent-based electrolyte comprising a solution of about 1.0% degassing agent; and (b) curing said polymer.

23. A process for impregnating an electrolytic capacitor stack or wound roll with an electrolyte having a breakdown voltage of at least about 700 V, comprising:

(a) impregnating said stack or wound roll with a solution comprising a polymerization initiator and a polymer matrix of a hydrogel in an organic solvent-based liquid electrolyte, said solvent-based electrolyte comprising up to 5.0% of a 20% solution of colloidal silica in ethylene glycol; and (b) curing said polymer.

24. A process for impregnating an electrolytic capacitor stack or wound roll with an electrolyte having a breakdown voltage of at least about 700 V, comprising:

(a) impregnating said stack or wound roll with a solution comprising a polymerization initiator and a polymer matrix of a hydrogel in an organic solvent-based liquid electrolyte, said solvent-based electrolyte comprising up to 20% by weight of a co-solvent of butyl carbitol; and (b) curing said polymer.

* * * * *

UNITED STATES PATENT AND TRADEMARK OFFICE
CERTIFICATE OF CORRECTION

PATENT NO. : 6,773,632 B1
DATED : August 10, 2004
INVENTOR(S) : Timothy R. Marshall and Thomas F. Strange It is certified that error appears in the above-identified patent and that said Letters Patent is hereby corrected as shown below:

Column 1,
Line 5, after the first sentence, please insert -- This application is related to co-pending Application Serial No. 09/458,584 filed December 9, 1999, and co-pending Application Serial No. 09/479,452, filed January 6, 2000. --

Signed and Sealed this

Twenty-eighth Day of September, 2004

JON W. DUDAS
*Director of the United States Patent and Trademark Office*